Jan. 20, 1942.   J. R. CLARK   2,270,697
RECTIFIER CIRCUIT
Filed Nov. 29, 1940
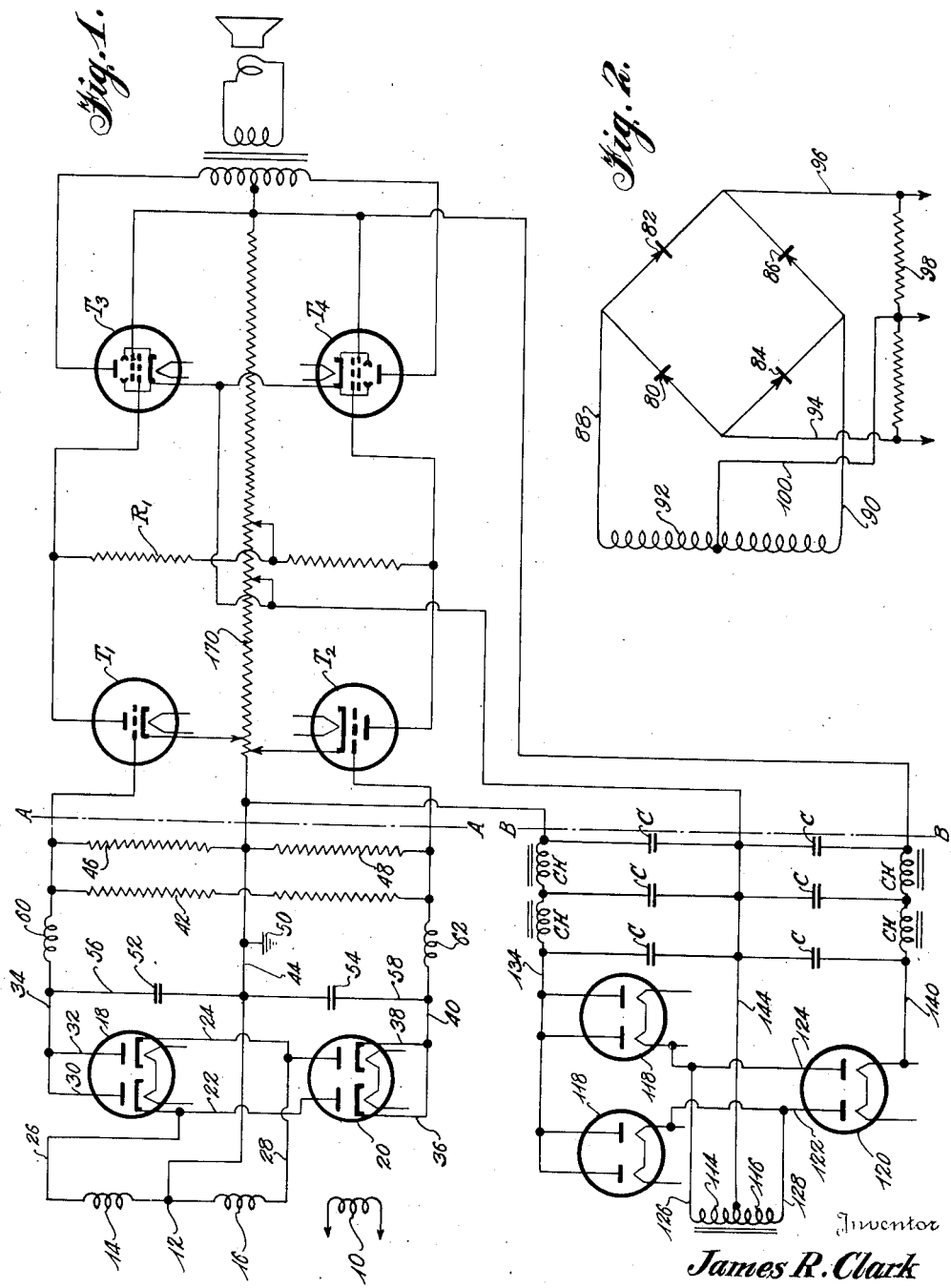
Inventor
James R. Clark
By Raymond Wbotton
Attorney Patented Jan. 20, 1942

2,270,697

UNITED STATES PATENT OFFICE 2,270,697

RECTIFIER CIRCUIT

James R. Clark, Santa Barbara, Calif.

Application November 29, 1940, Serial No. 367,859

11 Claims. (Cl. 250—27)

This invention relates to circuits adapted for push-pull rectification and voltage multiplication, particularly in their application to detection in radio reception.

Although it has been predicted in the past that a true push-pull detector circuit for radio receivers would contribute greatly to the tone and fidelity of their output signals, and in spite of innumerable technical and semi-technical articles treating the subject, it is believed that now, for the first time, a satisfactory solution to the problem has been reached. Numerous United States and foreign patents have been granted and many other publications have appeared in which push-pull recification and voltage multiplication circuits have been disclosed, but in no such case has there been attained a circuit providing truly balanced full wave rectification of the type contemplated by the present invention.

The rectifying circuit herein contemplated is essentially of the bridge type, which explains in part the highly balanced conditions under which it operates. One very important aspect of the circuit is the provision of a so-called neutral lead connecting the mid-point of the A. C. supply with the mid-point of the D. C. load. Another factor contributing greatly to the success of the circuit for detection is the use of a balanced triangular load formed by inserting a resistance between each pair of the three output leads.

Static and other noises are removed far into the background when employing this improved detector circuit, and in addition, fading is reduced, tone improved, and fidelity increased, as compared with circuits in current use. Due to its voltage multiplying feature, the circuit exhibits an exceedingly natural automatic volume expansion.

Accordingly, with a view towards providing the foregoing improved characteristics over rectifying circuits heretofore known in the art, it is an object of the present invention to produce push-pull rectifier circuits of the bridge type preferably utilizing the equivalent of four rectifying elements having their electrodes so connected that the A. C. supply is connected across opposite points of the bridge between dissimilar electrodes and the D. C. load connected across the remaining opposite points of the bridge between similar electrodes; the mid-point of the A. C. supply being connected by a neutral lead to the mid-point of the D. C. load. To further insure balanced conditions, three resistors are preferably arranged to form a balanced triangular load by connecting one of them between each pair of the three D. C. output leads.

Whereas the present invention is especially adapted for use as a detector for radio receiving sets, certain of its principles are equally applicable to other uses, among which may be mentioned power rectification.

For a complete understanding of the present invention, reference is made to the following detailed description of the proposed circuits, taken in conjunction with the appended drawing wherein:

Fig. 1 is a diagram illustrating the invention as applied to detector and power amplifier circuits of a radio receiver; and Fig. 2 is a simplified diagram of a circuit embodying certain phases of the invention.

In Fig. 1 of the drawing the invention is depicted in two of its aspects, namely, as a push-pull detector and as a full wave power rectifier. The first embodiment to the left of broken line A—A illustrates the application of the invention to a detector circuit wherein the primary winding 10 of an intermediate frequency transformer is coupled with a divided secondary wherein a center tap 12 separates it into two similar windings 14 and 16. A pair of double diodes 18 and 20 are depicted as having each anode of double diode 20 connected with a cathode of the double diode 18, by means of leads 22 and 24 respectively. To each of these leads, conductors 26 and 28 respectively from the outer ends of the secondary windings of the transformer are connected.

The anodes of the double diode 18 are connected together by leads 30 and 32 which join a common lead 34 to the output. The cathodes of the double diode 20 are also connected by leads 36 and 38 to a common lead 40 also to output.

Connected across the output leads 34 and 40 there is a resistance 42 and from the center tap of the transformer secondary, there is a so-called neutral lead 44, between which and each of the output leads 34 and 40 are connected resistances 46 and 48 respectively, each preferably having substantially the same value as the resistance 42, thereby constituting what may be termed a triangular load with respect to the three output leads 34, 40 and 44. The intermediate lead or neutral conductor 44 is grounded at 50 and is connected through capacitances 52 and 54 and conductors 56 and 58 respectively, with the output leads 34 and 40.

In the usual manner, radio frequency chokes 60 and 62 may be provided in the output leads 34 and 40 respectively, but satisfactory operation may be realized under some conditions without them. The detector circuit thus described is shown as connected with an amplifying circuit to the right of the broken line A—A, primarily to show how a detector circuit embodying the present invention can be incorporated in an operative system.

Certain aspects of the invention have been utilized for power rectification as illustrated in that portion of the circuit shown in the drawing to the left of the broken line B—B. In this case, a pair of double diodes 118, each used as a single diode, are connected with a double diode 120, in much the manner that the elements of the double diodes 18 and 20 are connected together. In this case, the transformer secondary is divided into two windings 114 and 116 with a center tap connected by a neutral lead 144 to an intermediate point of a resistance 170 constituting a portion of the load. The anodes of the rectifying tubes 118 are connected together and to an output lead 134, and in a similar manner, the cathodes of the tube 120 are connected together and to an output conductor 140. Each of the anodes of the tube 120 is connected with a pair of cathodes of the tubes 118 through leads 122 and 124 respectively. These leads joining the cathodes of one tube with the anode of another are connected to the output terminals of the transformer by means of leads 126 and 128 respectively. Filter circuits of the usual type have been shown, the condensers have been indicated by the character C and the chokes by the identification CH. The output leads 134 and 140 of the power rectifying circuit are connected across the load resistance 170 as clearly depicted in the drawing. Thus the resistance 170 in this embodiment is comparable with the resistances 46 and 48 of the detector circuit.

Fig. 2 of the drawing illustrates the invention in simplified form wherein four rectifiers 80, 82, 84 and 86 are connected in bridge relationship, with the outer leads 88 and 90 from the A. C. source, depicted as a transformer secondary 92, joined to opposite points of the bridge forming termini for dissimilar electrodes of two of the rectifiers. The other pair of opposite points of the bridge connecting similar electrodes of two of the rectifiers are joined by leads 94 and 96 to the D. C. load resistance 98. An intermediate point of the A. C. source is connected by a neutral lead 100 with an intermediate point of the load resistance 98. It is preferable that the intermediate points of the A. C. source and D. C. load to which the neutral lead is connected be the mid-points in an electrical sense.

It will be clear to those skilled in the art that single diodes may be interconnected to serve the same functions as the double diodes disclosed in accordance with the foregoing description. In a similar way, tubes with a greater number of elements such as triodes, may have their electrodes connected to accomplish a similar purpose. Moreover, it is contemplated that all of the elements necessary for rectification in accordance with the present invention may be enclosed within a single envelope.

No effort will be made to explain theoretically why the circuit of the present invention behaves in the extraordinary manner set forth in the foregoing discussion, but it may better enable workers in this field to practice the invention if some of the details of an operative example of the apparatus be given. According to current nomenclature, the tubes illustrated in the drawing may be as follows:

| Reference characters | Tube type |
|---|---|
| 18 and 20 | 6H6 |
| 118 and 120 | 80 |
| T₁ and T₂ | 76 |
| T₃ and T₄ | 6L6 |

Resistors 42, 46 and 48 may each have a value of 500,000 ohms. Resistor R₁ may have a value of 200,000 ohms. The resistor 170 serves as a voltage divider. Condensers 52 and 54 may each have a capacity of .0005 mfd.

The portion of the illustrated circuit to the right of the broken line A—A in Fig. 1 will probably be recognized as of the Loftin White push-pull type.

Various modifications of the specific circuits above described will undoubtedly suggest themselves as further study is devoted to this invention. Accordingly, the present invention should not be limited strictly to any form beyond the scope of the appended claims.

I claim:

1. A bridge circuit comprising four legs, each leg containing a rectifier, said legs being connected to provide a pair of opposed terminals each connecting dissimilar electrodes of two of said rectifiers, and a pair of opposed terminals each connecting similar electrodes of two of said rectifiers, a source of A. C. connected across the first said pair of terminals, a resistive load connected across the second said pair of terminals, and means maintaining intermediate points of said A. C. supply and said load at equal potential.

2. A bridge circuit comprising four legs, each leg containing a rectifier, said legs being connected to provide a pair of opposed terminals each connecting dissimilar electrodes of two of said rectifiers, and a pair of opposed terminals each connecting similar electrodes of two of said rectifiers, a source of A. C. connected across the first said pair of terminals, a load connected across the second said pair of terminals, and a lead connecting intermediate points of said A. C. supply and said load, said load comprising resistors of substantially equal value connected across said second pair of terminals and between each of said second pair of terminals and said lead.

3. A rectifier circuit comprising a source of A. C. supply and a D. C. resistive load, a plurality of rectifiers in bridge relationship, a pair of A. C. supply leads connected to one pair of the terminals of said bridge, each of said leads being connected with dissimilar electrodes of two rectifiers, a pair of D. C. output leads connected to said D. C. resistive load from another pair of the terminals of said bridge, each of said second pair of leads connecting similar electrodes of two rectifiers, and a lead connecting an intermediate point of said supply with an intermediate point of said load.

4. A rectifier circuit comprising a source of A. C. supply and a D. C. load, a plurality of rectifiers in bridge relationship, a pair of A. C. supply leads connected to one pair of the terminals of said bridge, each of said leads being connected with dissimilar electrodes of two rectifiers, a pair of D. C. output leads connected to said D. C. load from another pair of the terminals of said bridge, each of said second pair of leads connecting similar electrodes of two rectifiers, and a neutral lead connecting an intermediate point of said supply with an intermediate point of said load, said load comprising resistors connected across said output leads and between each output lead and said neutral lead.

5. A push-pull detector circuit for radio receivers comprising four diodes arranged in bridge relationship defining a first pair of terminals connected to dissimilar electrodes of the diodes, and a second pair of terminals connected to similar electrodes of the diodes, a radio frequency transformer having a secondary connected across said first pair of terminals, a resistive load connected across said second pair of terminals, and an intermediate tap on said secondary connected with an intermediate tap of said load.

6. A push-pull detector circuit for radio receivers comprising four diodes arranged in bridge relationship defining a first pair of terminals connected to dissimilar electrodes of the diodes, and a second pair of terminals connected to similar electrodes of the diodes, a radio frequency transformer having a secondary connected across said first pair of terminals, a resistor connected across said second pair of terminals, an intermediate tap on said secondary connected with an intermediate tap of said load and resistors connected between each of said second pair of terminals and said taps.

7. A push-pull detector circuit for radio receivers comprising two twin diodes having their electrodes connected in bridge relationship defining a first pair of terminals connected to dissimilar electrodes of the diodes, and a second pair of terminals connected to similar electrodes of the diodes, a transformer having a winding connected across said first pair of terminals, a resistive load connected across said second pair of terminals, and an intermediate tap on said winding connected with an intermediate tap of said load.

8. A push-pull detector circuit for radio receivers comprising four rectifiers arranged in bridge relationship defining a first pair of terminals connected to dissimilar electrodes of the rectifiers, and a second pair of terminals connected to similar electrodes of the rectifiers, a radio frequency transformer having a secondary connected across said first pair of terminals, a resistive load connected across said second pair of terminals, and a center tap on said secondary connected with a center tap of said load.

9. A push-pull detector circuit for radio receivers comprising four rectifiers arranged in bridge relationship defining a first pair of terminals connected to dissimilar electrodes of the rectifiers, and a second pair of terminals connected to similar electrodes of the rectifiers, a radio frequency transformer having a secondary connected across said first pair of terminals, a resistive load connected across said second pair of terminals, and means maintaining an intermediate point of said secondary at the same potential as an intermediate point of said load.

10. A push-pull detector circuit for radio receivers comprising four rectifiers arranged in bridge relationship defining a first pair of terminals connected to dissimilar electrodes of the rectifiers, and a second pair of terminals connected to similar electrodes of the rectifiers, a transformer having a winding connected across one pair of said terminals, a pair of leads connected across the other pair of terminals, a resistor connected across the leads of said pair and similar resistors connected between each lead of said pair and an intermediate point of said winding.

11. A rectifier circuit comprising a source of A. C. supply and a D. C. load, a plurality of rectifiers in bridge relationship, a pair of A. C. supply leads connected to one pair of the terminals of said bridge, each of said leads being connected with dissimilar electrodes of two rectifiers, a pair of D. C. output leads connected to said D. C. load from another pair of the terminals of said bridge, each of said second pair of leads connecting similar electrodes of two rectifiers, and a neutral lead connecting an intermediate point of said supply with an intermediate point of said load, said load comprising impedances connected across said output leads and between each output lead and said neutral lead.

JAMES R. CLARK.